US012729012B2

(12) United States Patent
Heckl et al.

(10) Patent No.: US 12,729,012 B2
(45) Date of Patent: Sep. 8, 2026

(54) ROTORCRAFT WITH A BLADE TIP ILLUMINATION SYSTEM

(71) Applicant: AIRBUS HELICOPTERS DEUTSCHLAND GMBH, Donauworth (DE)

(72) Inventors: Michael Heckl, Donauworth (DE); Julius Vogl, Gersthofen (DE)

(73) Assignee: AIRBUS HELICOPTERS DEUTSCHLAND GMBH (DE)

( * ) Notice: Subject to any disclaimer, the term of this patent is extended or adjusted under 35 U.S.C. 154(b) by 128 days.

(21) Appl. No.: 18/222,558

(22) Filed: Jul. 17, 2023

(65) Prior Publication Data

US 2024/0239512 A1 Jul. 18, 2024

(30) Foreign Application Priority Data

Aug. 29, 2022 (EP) .................................... 22400009

(51) Int. Cl.

| | |
|---|---|
| ***B64D 47/06*** | (2006.01) |
| ***B64C 27/46*** | (2006.01) |
| ***B64C 27/82*** | (2006.01) |
| ***F21K 2/00*** | (2006.01) |

(52) U.S. Cl.

CPC ............ *B64D 47/06* (2013.01); *B64C 27/463* (2013.01); *B64C 27/82* (2013.01); *F21K 2/00* (2013.01); *B64C 2027/8281* (2013.01)

(58) Field of Classification Search

CPC .... B64D 47/02; B64D 47/06; B64D 2203/00; B64C 2027/8281; B64C 27/463

See application file for complete search history.

(56) References Cited

U.S. PATENT DOCUMENTS

| | | | | |
|---|---|---|---|---|
| 10,053,214 | B2 * | 8/2018 | Schoen | F21V 9/32 |
| 2014/0084105 | A1 | 3/2014 | Eglin | |
| 2019/0383462 | A1 * | 12/2019 | Schoen | G01N 21/958 |
| 2021/0086903 | A1 * | 3/2021 | Cueto-Gomez | B64D 47/02 |

FOREIGN PATENT DOCUMENTS

| | | | |
|---|---|---|---|
| CN | 109018394 | A | 12/2018 |
| DE | 102014223727 | A1 | 5/2016 |
| EP | 3072813 | B1 | 9/2016 |

OTHER PUBLICATIONS

PE2E English Translation of CN-109018394-A (Year: 2018).*
European Search Report for European Application No. EP 22400009.1, Completed by the European Patent Office, Dated Jan. 25, 2023, 7 pages.

* cited by examiner

*Primary Examiner* — Nicholas McFall
*Assistant Examiner* — Eric Acosta
(74) *Attorney, Agent, or Firm* — Brooks Kushman P.C.

(57) ABSTRACT

A rotorcraft with a fuselage and a tail boom, comprising: a horizontal stabilizer mounted to the tail boom; rotor blades with rotor blade tips which form a virtual blade tip circle upon rotation around a rotor head; luminescent components provided on the rotor blade tips; and a blade tip illumination device comprising at least one light source integrated into the horizontal stabilizer and configured to emit a light beam toward the virtual blade tip circle for excitation of the luminescent components; wherein the luminescent components emit light in response to excitation via the emitted light beam, and wherein the emitted light forms during rotation of the rotor blade tips around the rotor head on the virtual blade tip circle a luminous ring.

20 Claims, 3 Drawing Sheets

6i
1
6h
1a
6g
1h
1g
12
2c
1d
3b
7b
1f
2
2b
3a
5
3
4
2a
7
7a
1b
1e
2d
1c
6b
6c 1
6h
1h
7
1e
5
1d
2b
1a
1b
6b
9h
12a
8b
8a
IV
V
9b
7b
7a
6i,12
3a
2c
2d
2a
10
2
14
1f

ROTORCRAFT WITH A BLADE TIP ILLUMINATION SYSTEM

CROSS-REFERENCE TO RELATED APPLICATIONS

This application claims priority to European patent application No. EP 22400009.1 filed on Aug. 29, 2022, the disclosure of which is incorporated in its entirety by reference herein.

TECHNICAL FIELD

The disclosure is related to a rotorcraft with a blade tip illumination system.

BACKGROUND

In various flight missions of rotorcrafts precise and reliable information with respect to distances between the rotorcrafts and respective obstacles is required. For instance, if a rotorcraft such as a helicopter is hovering close to a wind turbine generator, e.g., for hoisting above the nacelle resp. maintenance platform of the wind turbine generator, the pilot of the helicopter must take extreme care that the helicopter is not drifting towards the wind turbine generator structure and/or its wind turbine blades. This also generally applies to any confined area, e.g., close to mountain ridges, trees, etc.

Furthermore, particular flight conditions may also be challenging for pilots. For instance, comparatively slow helicopter side drift due to repetitive side wind gusts may easily go unnoticed by the pilot and result in a stepwise drifting of the helicopter towards the wind turbine generator structure and/or its wind turbine blades. Moreover, in flight conditions with comparatively low visibility, e.g., due to night time, visibility to certain position reference points at the wind turbine generator may also be rather limited.

In the flight missions and flight conditions described above, the pilot may be placed in a position to prevent a potentially disastrous rotor strike of the helicopter's rotor blades against the wind turbine generator structure and/or its wind turbine blades by providing the pilot with precise and reliable information with respect to distances between the helicopter and the wind turbine generator structure and/or its wind turbine blades.

Another problem arises, however, with respect to ground personnel acting on ground around helicopters, e.g., medics in Emergency Medical Service missions. Such ground personnel is endangered and may be harmed by the rotor blades of the helicopter and, more particularly, by respective rotor blade tips as they are rarely visible and distinguishable in night time missions.

The document EP 3 072 813 B1 describes a helicopter comprising a helicopter light system with layer material and light sources. The layer material comprises at least one of a fluorescent material and a phosphorescent material. The light sources comprise any appropriate lighting device, such as a light bulb, LED, or OLED in any appropriate number, which is capable of generating light in appropriate color and of sufficient lighting power to be directed onto the layer material for sufficient light emission and/or reflection by the layer material. More specifically, the helicopter comprises a helicopter body, which includes a main frame and a tail boom. Furthermore, the helicopter comprises multiple rotor blades, each rotor blade having rotor blade tips at both of its ends, wherein layer material of the helicopter light system is arranged at only one rotor tip or at both rotor tips of a given rotor blade. Particularly, the layer material is arranged on a side of the rotor blade tip of the given rotor blade that faces the helicopter body, which side is a bottom side of the given rotor blade. When light from a given light source of the helicopter light system is directed onto the layer material on the given rotor blade, visible light is emitted and/or reflected by the layer material during rotation of the given rotor blade of the helicopter.

However, the helicopter light system uses a plurality of different light sources distributed over the helicopter's fuselage. Accordingly, a complex and cost-intensive blade tip illumination system is provided.

SUMMARY

It is, therefore, an object of the present disclosure to provide a new rotorcraft with a simplified blade tip illumination system that is suitable to overcome the above-described drawbacks and problems of the state-of-the-art.

More specifically, according to the present disclosure a rotorcraft with a fuselage and a tail boom comprises: a horizontal stabilizer mounted to the tail boom, at least one main rotor, at least one luminescent component, and a blade tip illumination device. The at least one main rotor comprises a rotor head and a plurality of rotor blades extending from the rotor head toward associated rotor blade tips, wherein the associated rotor blade tips form a virtual blade tip circle upon rotation around the rotor head. The at least one luminescent component is provided on at least one of the associated rotor blade tips. The blade tip illumination device comprises at least one light source configured to emit a light beam toward the virtual blade tip circle for excitation of the at least one luminescent component. The at least one luminescent component is adapted to emit light in response to excitation via the emitted light beam, wherein the emitted light forms during rotation of the associated rotor blade tips around the rotor head on the virtual blade tip circle a luminous ring. The at least one light source is integrated into the horizontal stabilizer.

Advantageously, in the inventive rotorcraft the blade tip illumination system with the blade tip illumination device and the at least one luminescent component enables particularly in night time missions, but also in day time missions, a clear indication of the rotor blade tips to a pilot of the rotorcraft, thereby increasing safety of flight and maneuver potential of the rotorcraft. Furthermore, a clear indication of the rotor blade tips may be provided to ground personnel acting on ground around the rotorcraft, thereby increasing safety of the ground personnel and reducing a possible endangerment of the ground personnel. The blade tip illumination system has a simple low-cost configuration and avoids a requirement for expensive additional components.

More specifically, such a low-cost configuration may be obtained by painting conventional standard rotor blades on their rotor blade tips with reflective paintings or coatings. Alternatively, low-cost stickers may be attached to the rotor blade tips. However, application of the reflective paintings or coatings, or stickers, is not limited to the rotor blade tips, but could also be made on the entire rotor blades or on one or more selected sections thereof.

Preferably, the reflective paintings or coatings, or stickers, illuminate the rotor blade tips in response to being charged, i.e., excited with the light beams. Preferentially, the reflective paintings or coatings, or stickers, provide for a so-called "afterglow effect", i.e., they emit light in rotation of the at least one main rotor not only at the positions where they are charged, i.e., excited with the light beams, but all over the virtual blade tip circle.

By way of example, a reflective painting on the rotor blade tip of a given rotor blade may comprise a base coat that enables application of a paint, a phosphorescent paint applied on the base coat to make the rotor blade tip visible, and a glossy clear coat. The phosphorescent paint may be provided in several colors and can be applied in a suitable thickness according to a respectively desired brightness. The glossy clear coat may be used to make the rotor blade tip visible with a night-vision device. Generally, the reflective painting on the given rotor blade is preferably applied on the rotor blade's lower side (or underside), but application is not limited to the lower side if e.g., visibility on top shall be increased as well.

Furthermore, on the rotorcraft's horizontal stabilizer, which is e.g., provided on the rotorcraft's tail boom, one or more light sources (e.g., white and/or infrared) are installed and their respective light beams are directed towards the rotor blades and, more particularly, to the rotor blade tips. The position of the light sources on the horizontal stabilizer is preferably on the left and right side of the rotorcraft.

Preferably, a light source such as e.g., LED, Halogen, Laser, Xenon, etc. is used which emits white light, but which may also emit some light in infrared spectrum for reflection by the reflective paintings or coatings, or stickers. However, the light source may likewise emit some light in the whole spectrum from ultraviolet to infrared. In other words, the light source may also be an ultraviolet light source.

Preferably, for white light (measured in cd) a white light beam with a luminous intensity of at least 65,000 cd, preferably 68,000 cd, and with a beam angle of less than 10°, preferably 8°, is generated. In other words, a suitable level of lighting power of the light source is required so that the light beam will sufficiently charge the reflective paintings or coatings, or stickers. Preferably, at least in night time missions the reflection of the light beams is visible and may, thus, make the rotor blade tips, i.e., the rotor blades visible to rotorcraft personnel or crew, as well as ground personnel and/or passengers.

If desired, the rotor blade tips, i.e., the rotor blades may be made visible with the blade tip illumination system upon request/need by a pilot of the rotorcraft, e.g., by switching the system manually/automatically on when needed. By charging the reflective paintings or coatings, or stickers by the one or more light sources installed in the non-rotating system of the rotorcraft, there is low dynamic impact, coupled with low costs, low weight impact and easy retrofit installation and compatibility with existing rotorcrafts and systems. The afterglow effect of the reflective paintings or coatings, or stickers ensures proper behavior as the afterglow ensures lighting even after the one or more light sources are shut off, or in case of failure. This is advantageous as e.g., ground personnel acting around a rotorcraft immediately after landing may distinguish the rotor blade tips, i.e., the rotor blades, for a predetermined time once the rotorcraft is shut off.

In an illustrative realization, comparatively powerful light sources generating e.g., white light beams with a luminous intensity of at least 65,000 cd, preferably 68,000 cd, are used as described above and arranged on top of the horizontal stabilizer, but integrated into the horizontal stabilizer, to charge in each luminescent component a respective phosphorescent paint during rotation of the at least one main rotor. Due to the comparatively short distance between the horizontal stabilizer and the virtual blade tip circle of at most 2 m, preferably 1.5 m, as well as an improved illumination angle, i.e., nearly perpendicular to the phosphorescent paint, a suitable charging effect may be obtained. The light sources themselves are preferably suitable to emit comparatively focused light beams with a beam angle of less than 10°, preferably 8°, so that illumination of a few percent (preferably lower than 5%) of the virtual blade tip circle is sufficient. However, due to the comparatively high power, good angle and concentrated light beams, it is still enough to charge the phosphorescent paint itself so high that the full virtual blade tip circle is clearly visible with human eyes, even if more than 90% of the virtual blade tip circle are not illuminated by the light sources at all. In fact, the charging of the phosphorescent paint causes a comparatively high emitting of light by photons, i.e., by the phosphorescent paint itself. The phosphorescent paint itself is preferably just applied on selected areas on the rotor blade tips. No cover is needed to protect the phosphorescent paint and preferably just a glossy clear coat is applied on the phosphorescent paint.

According to some aspects, the horizontal stabilizer forms a wing-like structure with an inner volume, wherein the at least one light source is arranged inside the inner volume.

Preferably, the at least one light source is covered by a transparent cover, wherein the transparent cover is aligned with an upper surface of the horizontal stabilizer.

The emitted light beam may be a white light beam with a luminous intensity of at least 65,000 cd, preferably 68,000 cd, and with a beam angle of less than 10°, preferably 8°.

By way of example, the horizontal stabilizer and the virtual blade tip circle are spaced apart from each other by a predetermined vertical distance of at most 2 m, preferably 1.5 m.

Preferably, the emitted light beam is at least approximately emitted in a direction perpendicular to the horizontal stabilizer.

The emitted light beam may be focused towards the virtual blade tip circle and strikes the at least one luminescent component at least approximately perpendicularly during rotation of the associated rotor blade tips around the rotor head.

The at least one light source may be one of a LED, Halogen, Laser or Xenon light.

According to some aspects, the at least one luminescent component comprises a luminescent sticker attached on the at least one of the associated rotor blade tips, and/or a luminescent coating applied to the at least one of the associated rotor blade tips.

The luminescent coating may comprise at least a base coating, a phosphorescent layer, and a glossy clear coating.

Preferably, the glossy clear coating comprises a glossiness of more than 90 Gloss units.

If desired, the phosphorescent layer is adapted to return light in response to excitation with a white light beam, and the glossy clear coating is adapted to return light in response to excitation with an infrared light beam.

According to some aspects, the rotorcraft further comprises a command unit configured to command the at least one light source to emit one of the white light beam, or the infrared light beam.

If desired, the emitted light may have a wavelength suitable for detection with a night-vision device, if the emitted light beam is the infrared light beam with a radiant intensity of approximately 0.1 W/sr.

Preferably, the luminous ring disappears within predetermined period of time, preferably within less than 5 minutes, if the at least one light source is switched off.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
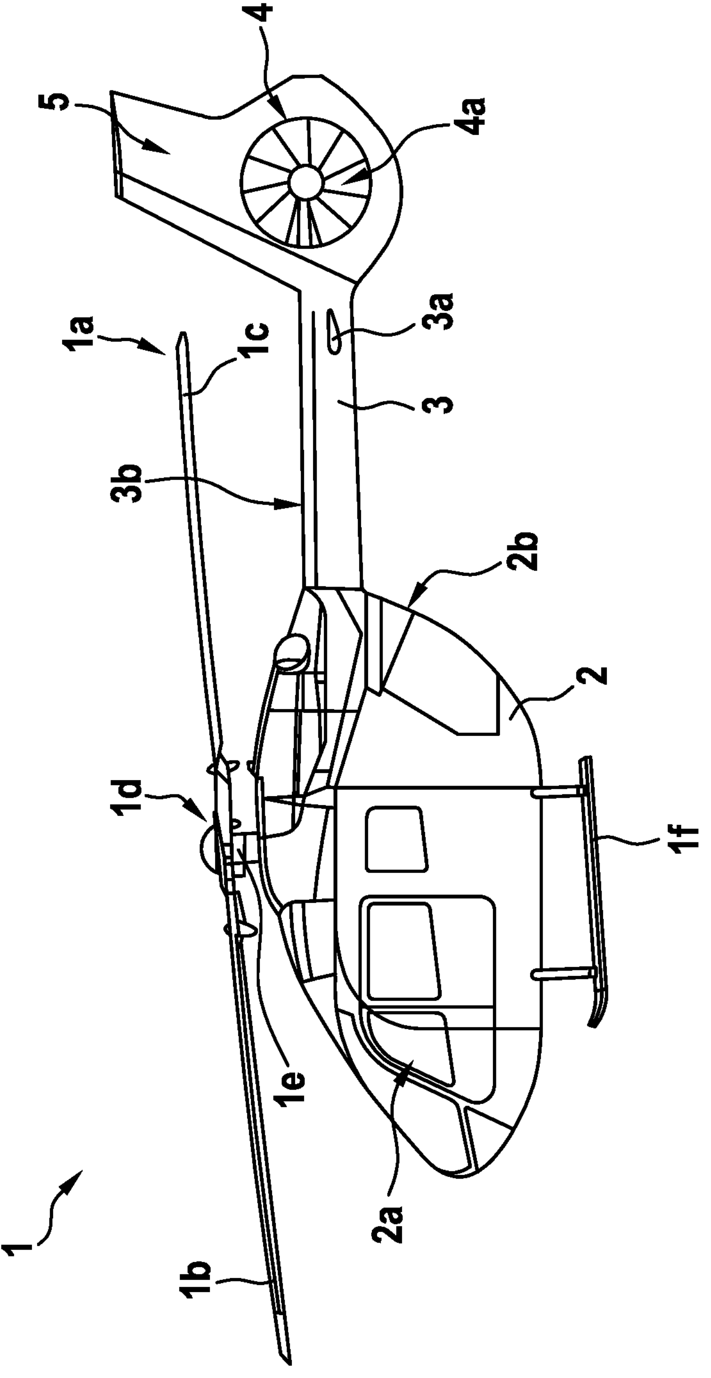
FIG. 1 shows a lateral view of an illustrative rotorcraft.

FIG. 1 shows a rotorcraft 1 that is, by way of example, illustrated as a helicopter. Thus, for purposes of simplicity and clarity, the rotorcraft 1 is hereinafter referred to as the "helicopter 1". The present disclosure is, however, not limited to helicopters and may likewise be applied to any other rotorcraft.

Illustratively, the helicopter 1 comprises at least one main rotor 1*a*, preferably a multi-blade main rotor, for providing lift and forward or backward thrust during operation. By way of example, the at least one main rotor 1*a* comprises a plurality of rotor blades which are connected at an associated rotor head 1*d* to a rotor shaft 1*e*, which rotates in operation of the helicopter 1 about an associated rotor axis. Two rotor blades of the plurality of rotor blades are visible in FIG. 1 and separately labelled with the reference signs 1*b*, 1*c*.

Furthermore, the helicopter 1 comprises a fuselage 2 that preferably forms an aircraft interior region 2*a*. Illustratively, a left-hand side of the fuselage 2 is shown and, thus, a portside wall (2*d* in FIG. 2) of the fuselage 2 of the helicopter 1, to which a landing gear 1*f* of the skid-type is attached, by way of example. The aircraft interior region 2*a* may accommodate a cockpit and may further accommodate a cabin for passengers and/or cargo.

By way of example, a tail boom 3 with a horizontal stabilizer 3*a* is connected at a rear fuselage 2*b* to the fuselage 2 of the helicopter 1. The tail boom 3 is illustratively implemented as a slim beam element that comprises at least a tubular tail boom cone 3*b*.

The helicopter 1 illustratively further comprises at least one preferentially shrouded counter-torque device 4 configured to provide counter-torque during operation, i.e., to counter the torque created by rotation of the at least one main rotor 1*a* for purposes of balancing the helicopter 1 in terms of yaw. The at least one counter-torque device 4 is illustratively provided at an aft section of the tail boom 3 and preferably comprises a tail rotor 4*a*. The aft section of the tail boom 3 preferably further comprises a fin 5.

Figure 2:
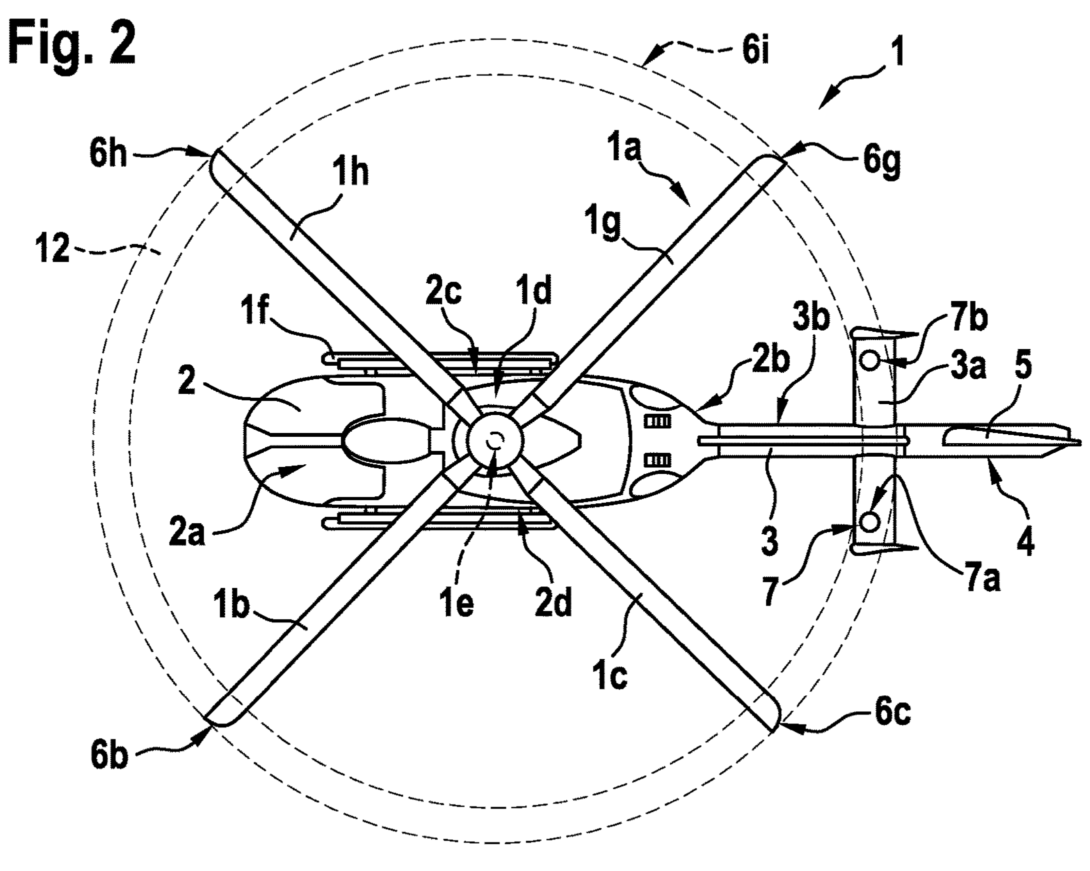
FIG. 2 shows a top view of the rotorcraft of FIG. 1 with a blade tip illumination system according to an aspect, with the blade tip illumination system in operation.

FIG. 2 shows the helicopter 1 of FIG. 1 seen from above. The helicopter 1 comprises the fuselage 2 that illustratively forms a starboard side wall 2*c* and a portside wall 2*d*. The tail boom 3 is connected to the fuselage 2 at the rear fuselage 2*b* and comprises the horizontal stabilizer 3*a*, the counter-torque device 4 and the fin 5. The helicopter 1 further comprises the at least one main rotor 1*a* with the plurality of rotor blades which are connected at the rotor head 1*d* to the rotor shaft 1*e*.

The plurality of rotor blades comprises the rotor blades 1*b*, 1*c* of FIG. 1, as well as two additional rotor blades 1*g*, 1*h*. The plurality of rotor blades 1*b*, 1*c*, 1*g*, 1*h* extend from the rotor head 1*d* toward associated rotor blade tips 6*b*, 6*c*, 6*g*, 6*h*. The rotor blade tips 6*b*, 6*c*, 6*g*, 6*h* form a virtual blade tip circle 6*i* upon rotation around the rotor head 1*d*. The blade tip circle 6*i* is referred to as being "virtual", as actually no circle is formed. In fact, the rotor blade tips 6*b*, 6*c*, 6*g*, 6*h* are merely travelling along a circular path around the rotor head 1*d*.

In order to enable especially in night time missions, but preferably also in day-time missions, of the helicopter 1 a clear indication of the rotor blade tips 6*b*, 6*c*, 6*g*, 6*h* to a pilot (10 in FIG. 3) of the helicopter 1, a blade tip illumination system with a blade tip illumination device 7 and at least one luminescent component (9*b*, 9*h* in FIG. 3) is provided. The at least one luminescent component is provided on at least one of the rotor blade tips 6*b*, 6*c*, 6*g*, 6*h*, as described in more detail below at FIG. 3 and FIG. 5.

The blade tip illumination device 7 comprises at least one light source configured to emit a light beam toward the virtual blade tip circle 6*i* for excitation of the at least one luminescent component. The at least one light source may be one of a LED, Halogen, Laser or Xenon light.

Figure 3:
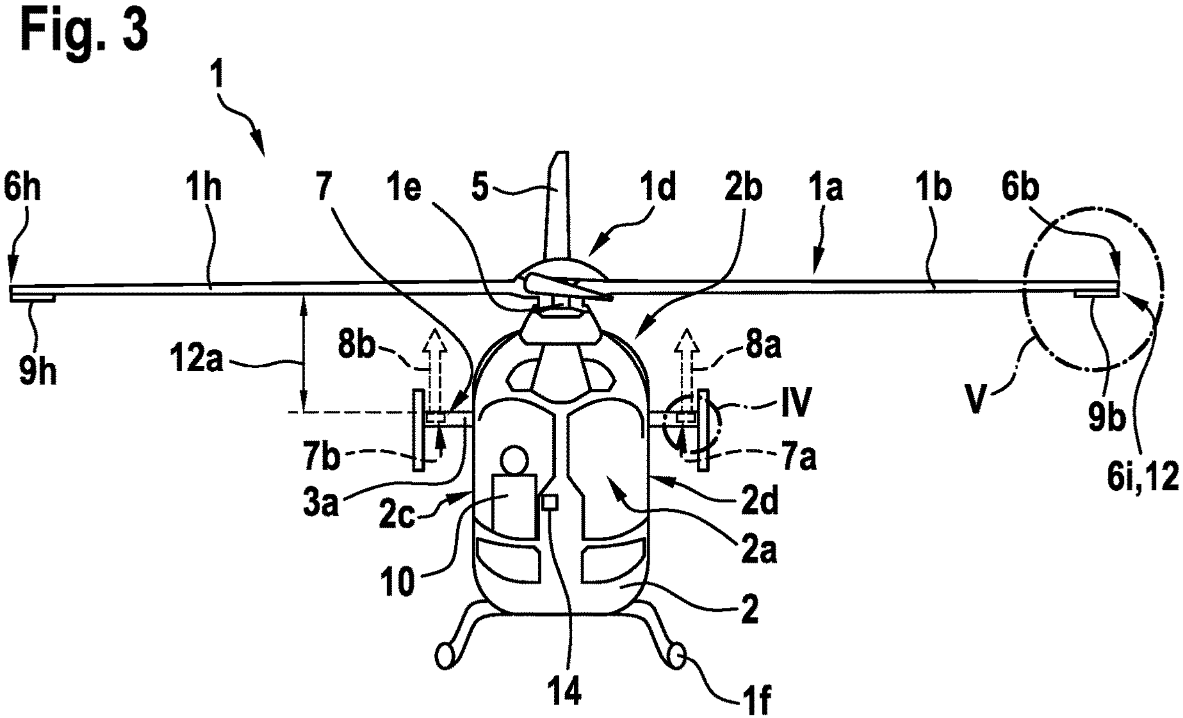
FIG. 3 shows a front view of the rotorcraft of FIG. 2 with the blade tip illumination system in operation.

Illustratively, the blade tip illumination device 7 comprises two light sources 7*a*, 7*b*, each one being configured to emit an associated light beam (8*a*, 8*b* in FIG. 3) toward the virtual blade tip circle 6*i* for excitation of the at least one luminescent component (9*b*, 9*h* in FIG. 3). The two light sources 7*a*, 7*b* are integrated into the horizontal stabilizer 3*a* of the tail boom 3, as explained in detail at FIG. 4. Illustratively, each one of the two light sources 7*a*, 7*b* is arranged on, or close to, an outer, i.e., free end of the horizontal stabilizer 3*a*.

Each luminescent component (9*b*, 9*h* in FIG. 3) is adapted to emit light in response to excitation via, i.e., in response to being charged by, the emitted light beams of the two light sources 7*a*, 7*b*. The emitted light forms during rotation of the rotor blade tips 6*b*, 6*c*, 6*g*, 6*h* around the rotor head 1*d* on the virtual blade tip circle 6*i* a luminous ring 12. Each luminescent component may comprise a luminescent sticker attached on an associated one of the rotor blade tips 6*b*, 6*c*, 6*g*, 6*h*, and/or a luminescent coating (13*a*, 13*b*, 13*c* in FIG. 5) applied to the associated one of the rotor blade tips 6*b*, 6*c*, 6*g*, 6*h*.

FIG. 3 shows the helicopter 1 of FIG. 2 seen from the front. The helicopter 1 comprises the fuselage 2 that forms the aircraft interior region 2*a*, the starboard side wall 2*c*, and the portside wall 2*d*. The helicopter 1 further comprises the at least one main rotor 1*a* with the plurality of rotor blades, from which only the rotor blades 1*b*, 1*h* are visible. The plurality of rotor blades 1*b*, 1*h* is connected at the rotor head 1*d* to the rotor shaft 1*e* and each one of the rotor blades has an associated rotor blade tip. As only the rotor blades 1*b*, 1*h* are visible, likewise only the rotor blade tips 6*b*, 6*h* are visible. The rotor blade tips 6*b*, 6*h* form the virtual blade tip circle 6*i* upon rotation around the rotor head 1*d*. The virtual blade tip circle 6*i* is preferably spaced apart from the horizontal stabilizer 3*a* by a predetermined vertical distance 12*a* of at most 2 m, preferably 1.5 m.

Moreover, the helicopter 1 comprises the blade tip illumination system with the blade tip illumination device 7 having the two light sources 7*a*, 7*b*, as well as the at least one luminescent component. The two light sources 7*a*, 7*b* are configured to emit associated light beams 8*a*, 8*b*. Each one of the emitted light beams 8*a*, 8*b* may be a white light beam with a luminous intensity of at least 65,000 cd, preferably 68,000 cd, and with a beam angle of less than 10°, preferably 8°. Illustratively, each one of the emitted light beams 8*a*, 8*b* is at least approximately emitted in a direction perpendicular to the horizontal stabilizer 3*a*. More specifically, the emitted light beams 8*a*, 8*b* are preferably focused towards the virtual blade tip circle 6*i* and strike the at least one luminescent component at least approximately perpendicularly during rotation of the rotor blade tips 6*b*, 6*h* around the rotor head 1*d*.

Preferably, each one of the rotor blade tips is provided with an associated luminescent component. Illustratively, the rotor blade tip 6*b* is provided with a luminescent component 9*b*, and the rotor blade tip 6*h* is provided with a luminescent component 9*h*. Preferably, the luminescent components 9*b*, 9*h* are arranged on a lower side, i.e., an underside of the rotor blade tips 6*b*, 6*h*.

In operation of the helicopter 1, the rotor blades 1*b*, 1*h* and, thus, the rotor blade tips 6*b*, 6*h* rotate around the rotor head 1*d* and form the virtual blade tip circle 6*i*. Thereby, the luminescent components 9*b*, 9*h* provided on the rotor blade tips 6*b*, 6*h* may be excited, i.e., charged by the light beams 8*a*, 8*b* emitted from the light sources 7*a*, 7*b* which are integrated into the horizontal stabilizer 3*a*. The luminescent components 9*b*, 9*h* preferably emit light in response to excitation via the emitted light beams 8*a*, 8*b* of the two light sources 7*a*, 7*b* and the emitted light forms during rotation of the rotor blade tips 6*b*, 6*h* around the rotor head 1*d* on the virtual blade tip circle 6*i* the luminous ring 12. The luminous ring 12 is preferably visible from the aircraft interior region 2*a*, e.g., at least from a pilot 10 in the cockpit of the helicopter 1, but preferentially also e.g., from ground personnel acting during or after landing and/or before or during take-off around the helicopter 1 on ground. The luminous ring 12 preferably disappears within a predetermined period of time, preferentially within less than 5 minutes, if the light sources 7*a*, 7*b* are switched off. In other words, the luminescent components 9*b*, 9*h* provide for a so-called "afterglow effect", i.e., they emit light in rotation of rotor blades 1*b*, 1*h* and, thus, the rotor blade tips 6*b*, 6*h* around the rotor head 1*d* not only at the positions where they are charged, i.e., excited with the light beams 8*a*, 8*b*, but all over the virtual blade tip circle 6*i*.

If desired, the light sources 7*a*, 7*b* may be switched between emission of the white light beams 8*a*, 8*b* with the luminous intensities described above, and emission of infrared light beams, e.g., by means of a command unit 14 configured to command the light sources 7*a*, 7*b* to emit either the white light beams or the infrared light beams. If the light beams 8*a*, 8*b* are the infrared light beams, e.g., with a radiant intensity of approximately 0.1 W/sr, the emitted light from the luminescent components 9*b*, 9*h* may have a wavelength suitable for detection with a night-vision device. The wavelength suitable for detection by a night-vision device is preferably comprised in a wavelength spectrum ranging from 450 nm to 930 nm, preferentially from 650 nm to 850 nm.

Figure 4:
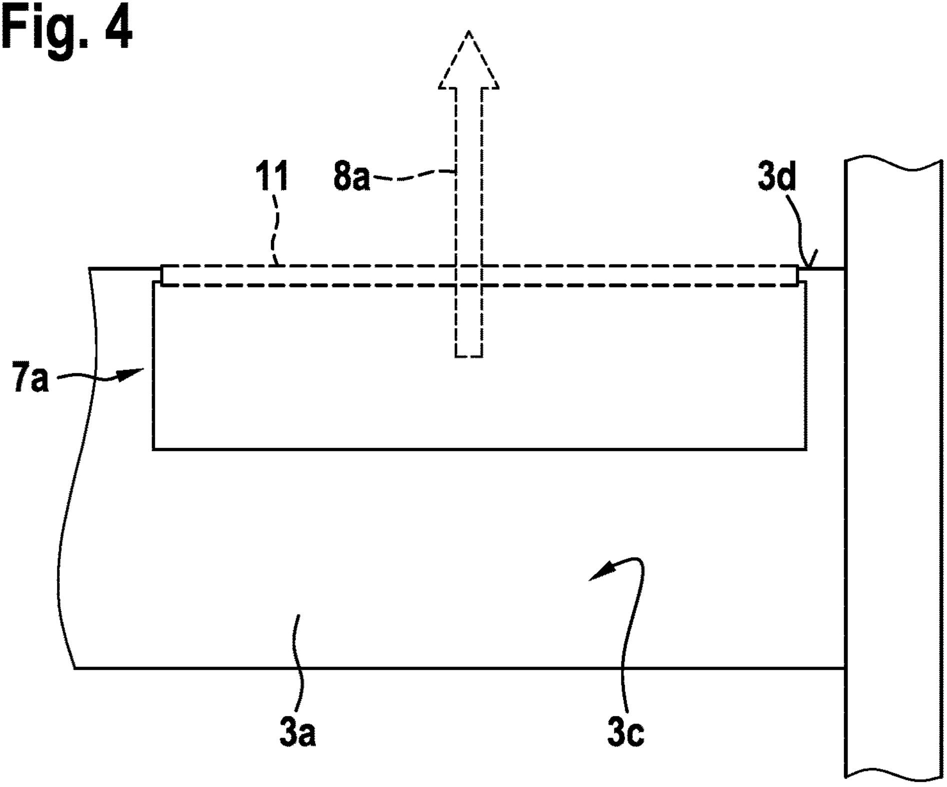
FIG. 4 shows a schematic view of a horizontal stabilizer of the rotorcraft of FIG. 1 to FIG. 3.

FIG. 4 shows the horizontal stabilizer 3*a* of the helicopter 1 of FIG. 1 to FIG. 3, with the light source 7*a* of the blade tip illumination device 7 of FIG. 1 to FIG. 3. By way of example, the outer end, i.e., free end of the horizontal stabilizer 3*a* on the left-hand side of the helicopter 1 of FIG. 1 to FIG. 3, i.e., on the side of the portside wall 2*d* of FIG. 2 and FIG. 3, is shown.

Illustratively, the horizontal stabilizer 3*a* forms a wing-like structure with an inner volume 3*c* and an upper surface 3*d*. The upper surface 3*d* is arranged on an upper side of the horizontal stabilizer 3*a* and, thus, faces the plurality of rotor blades 1*b*, 1*c*, 1*g*, 1*h* of FIG. 2, i.e., the virtual blade tip circle 6*i* of FIG. 2.

The light source 7*a* that emits the light beam 8*a* is integrated into the horizontal stabilizer 3*a* and, preferably, arranged inside the inner volume 3*c*. Furthermore, the light source 7*a* may be covered by a transparent cover 11. The transparent cover 11, in turn, may be aligned with the upper surface 3*d* of the horizontal stabilizer 3*a*. Thus, an aerodynamically improved arrangement of the light source 7*a* in the horizontal stabilizer 3*a* may be achieved.

It should be noted that integration of the light source 7*b* of FIG. 2 and FIG. 3 into the horizontal stabilizer 3*a* on the right-hand side of the helicopter 1 of FIG. 1 to FIG. 3, i.e., on the side of the starboard side wall 2*c* of FIG. 2 and FIG. 3, is preferably similar. Thus, a more detailed description thereof may be omitted, for brevity and conciseness.

Figure 5:
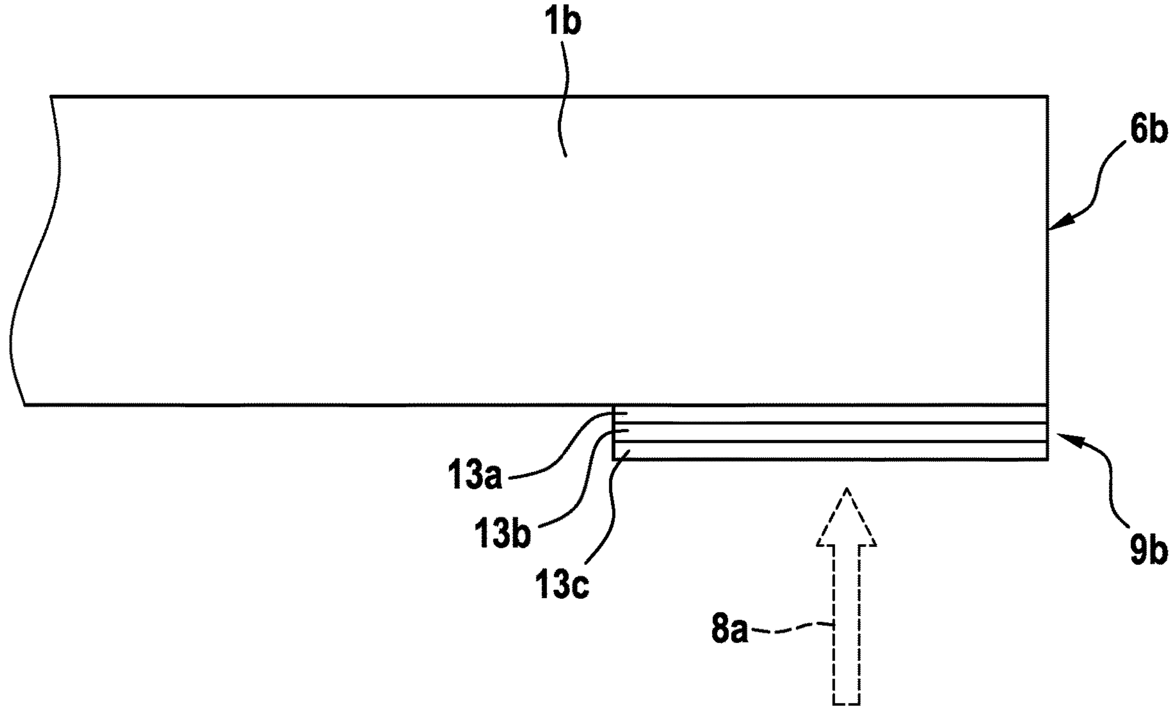
FIG. 5 shows a schematic view of a rotor blade tip with a luminescent component according to an aspect.

FIG. 5 shows the rotor blade tip 6*b* of the rotor blade 1*b* of FIG. 2 and FIG. 3, which is provided with the luminescent component 9*b* as described above at FIG. 3. The luminescent component 9*b* may comprise a luminescent sticker attached on the rotor blade tip 6*b*, and/or a luminescent coating applied to the rotor blade tip 6*b*.

By way of example, the luminescent component 9*b* is formed as a luminescent coating. Preferably, the luminescent coating comprises at least a base coating 13*a* and a phosphorescent layer 13*b*. The phosphorescent layer 13*b* may be adapted to emit light at least in response to being excited with a white light beam, i.e., with the light beams 8*a*, 8*b* of FIG. 3.

The luminescent coating may further comprise a glossy clear coating 13*c*. The glossy clear coating 13*c* may at least be adapted to return light in response to being excited with an infrared light beam and may be formed with a glossiness of more than 90 Gloss units.

Finally, it should be noted that modifications to the above-described embodiments are within the common knowledge of the person skilled in the art and, thus, also considered as being part of the present disclosure. For instance, FIG. 2, FIG. 3, and FIG. 5 make only reference to luminescent components provided on rotor blade tips. However, one or more rotor blades may also be provided with more than one luminescent component. For instance, a given rotor blade may be provided with a plurality of luminescent components which are spaced apart from each other on the given rotor blade, and so on.

REFERENCE LIST

1 rotorcraft
1*a* multi-blade main rotor
1*b*, 1*c*, 1*g*, 1*h* rotor blades
1*d* rotor head
1*e* rotor shaft
1*f* landing gear
2 fuselage
2*a* cockpit
2*b* rear fuselage
2*c* starboard side wall
2*d* port side wall
3 tail boom
3*a* horizontal stabilizer
3*b* tail boom cone
3*c* horizontal stabilizer inner volume

3*d* horizontal stabilizer upper surface
4 counter-torque device
4*a* tail rotor
5 fin
6*b*, 6*c*, 6*g*, 6*h* rotor blade tips
6*i* virtual blade tip circle
7 blade tip illumination device
7*a*, 7*b* light sources
8*a*, 8*b* light beams
9*b*, 9*h* luminescent components
10 rotorcraft pilot
11 transparent cover
12 luminous ring
12*a* vertical distance between horizontal stabilizer and virtual blade tip circle
13*a* base coating
13*b* phosphorescent layer
13*c* clear coating
14 command unit

What is claimed is:

1. A rotorcraft with a fuselage and a tail boom, comprising:

a horizontal stabilizer mounted to the tail boom;

at least one main rotor with a rotor head and a plurality of rotor blades extending from the rotor head toward associated rotor blade tips, wherein the associated rotor blade tips form a virtual blade tip circle upon rotation around the rotor head;

at least one luminescent component provided on at least one of the associated rotor blade tips; and a blade tip illumination device comprising at least one light source that is integrated into the horizontal stabilizer and configured to emit a light beam toward the virtual blade tip circle for excitation of the at least one luminescent component, wherein the emitted light beam is at least approximately emitted in a direction perpendicular to the horizontal stabilizer, and wherein the emitted light beam is focused towards the virtual blade tip circle and strikes the at least one luminescent component at least approximately perpendicularly during rotation of the associated rotor blade tips around the rotor head;

wherein the at least one luminescent component is adapted to emit light in response to excitation via the emitted light beam, wherein the emitted light forms during rotation of the associated rotor blade tips around the rotor head on the virtual blade tip circle a luminous ring, and wherein the emitted light beam is a light beam with a luminous intensity of at least 65,000 cd and with a beam angle of less than 10°.

2. The rotorcraft of claim 1, wherein the horizontal stabilizer forms a wing-like structure with an inner volume, and wherein the at least one light source is arranged inside the inner volume.

3. The rotorcraft of claim 1, wherein the at least one light source is covered by a transparent cover, and wherein the transparent cover is aligned with an upper surface of the horizontal stabilizer.

4. The rotorcraft of claim 1, wherein the emitted light beam is a white light beam.

5. The rotorcraft of claim 1, wherein the horizontal stabilizer and the virtual blade tip circle are spaced apart from each other by a predetermined vertical distance of at most 2 m.

6. The rotorcraft of claim 1, wherein the horizontal stabilizer and the virtual blade tip circle are spaced apart from each other by a predetermined vertical distance of 1.5 m.

7. The rotorcraft of claim 1, wherein the at least one light source is one of a LED, Halogen, Laser or Xenon light.

8. The rotorcraft of claim 1, wherein the at least one luminescent component comprises a luminescent coating applied to the at least one of the associated rotor blade tips.

9. The rotorcraft of claim 8, wherein the luminescent coating comprises at least a base coating, a phosphorescent layer, and a glossy clear coating.

10. The rotorcraft claim 9, wherein the glossy clear coating comprises a glossiness of more than 90 Gloss units.

11. The rotorcraft of claim 9, wherein the phosphorescent layer is adapted to return light in response to excitation with a white light beam, and wherein the glossy clear coating is adapted to return light in response to excitation with an infrared light beam.

12. The rotorcraft of claim 11, further comprising a command unit configured to command the at least one light source to emit one of the white light beam, or the infrared light beam.

13. The rotorcraft of claim 11, wherein the emitted light has a wavelength suitable for detection with a night-vision device, if the emitted light beam is the infrared light beam with a radiant intensity of approximately 0.1 W/sr.

14. The rotorcraft of claim 1, wherein the luminous ring disappears within a predetermined period of time, if the at least one light source is switched off.

15. The rotorcraft of claim 1, wherein the luminous ring disappears within a predetermined period of time that is less than 5 minutes, if the at least one light source is switched off.

16. The rotorcraft of claim 1, wherein the at least one luminescent component comprises a luminescent sticker attached on the at least one of the associated rotor blade tips.

17. The rotorcraft of claim 8, wherein the at least one luminescent component comprises a luminescent sticker attached on the at least one of the associated rotor blade tips.

18. The rotorcraft of claim 1, wherein the horizontal stabilizer forms a wing-like structure with an inner volume, and wherein the at least one light source is arranged inside the inner volume, wherein the at least one light source is covered by a transparent cover, and wherein the transparent cover is aligned with an upper surface of the horizontal stabilizer.

19. The rotorcraft of claim 18, wherein the at least one luminescent component comprises a luminescent sticker attached on the at least one of the associated rotor blade tips, or a luminescent coating applied to the at least one of the associated rotor blade tips.

20. A rotorcraft with a fuselage and a tail boom, comprising:

a horizontal stabilizer mounted to the tail boom;

at least one main rotor with a rotor head and a plurality of rotor blades extending from the rotor head toward associated rotor blade tips, wherein the associated rotor blade tips form a virtual blade tip circle upon rotation around the rotor head;

at least one luminescent component provided on at least one of the associated rotor blade tips; and a blade tip illumination device comprising at least one light source that is integrated into the horizontal stabilizer and configured to emit a light beam toward the virtual blade tip circle for excitation of the at least one luminescent component, wherein the emitted light beam is at least approximately emitted in a direction perpendicular to the horizontal stabilizer, and wherein the emitted light beam is focused towards the virtual blade tip circle and strikes the at least one luminescent component at least approximately perpendicularly during rotation of the associated rotor blade tips around the rotor head;

wherein the at least one luminescent component is adapted to emit light in response to excitation via the emitted light beam, wherein the emitted light forms during rotation of the associated rotor blade tips around the rotor head on the virtual blade tip circle a luminous ring, wherein the emitted light beam is a white light beam with a luminous intensity of 68,000 cd and with a beam angle of 8°.

* * * * *